United States Patent [19]

Ogita et al.

[11] Patent Number: 5,017,943

[45] Date of Patent: May 21, 1991

[54] THERMAL TRANSFER TYPE COLOR PRINTER

[75] Inventors: Hiromitsu Ogita; Akikazu Toida, both of Ise, Japan

[73] Assignee: Shinko Electric Co., Ltd., Tokyo, Japan

[21] Appl. No.: 282,302

[22] Filed: Dec. 9, 1988

[30] Foreign Application Priority Data

Dec. 9, 1987 [JP] Japan ................................ 62-311615
Dec. 9, 1987 [JP] Japan ................................ 62-311616

[51] Int. Cl.[5] ........................ G01D 15/24; B41J 15/24; G03B 1/24

[52] U.S. Cl. ................................ 346/76 PH; 226/27; 226/76; 400/616; 400/618; 400/228; 400/240.3; 346/136

[58] Field of Search ............. 346/87 PH, 136; 226/16, 226/24, 28, 43, 76, 148; 242/155 R; 400/616, 618, 228, 240.3

[56] References Cited

U.S. PATENT DOCUMENTS 4,551,729 11/1985 Kubo et al. .......................... 346/1.1
4,552,470 11/1985 Yana et al. .......................... 400/120
4,621,756 11/1986 Bullock et al. ........................ 226/76

FOREIGN PATENT DOCUMENTS 0170504 2/1986 European Pat. Off. .
2646603 4/1978 Fed. Rep. of Germany .
88260 1/1967 France .
58101278 1/1984 Japan .
59133791 1/1986 Japan .
59167756 3/1986 Japan .

*Primary Examiner*—Benjamin R. Fuller
*Assistant Examiner*—Gerald E. Preston
*Attorney, Agent, or Firm*—Hoffmann & Baron

[57] ABSTRACT

In a thermal transfer type color printer, an ink film on which plural color inks are sequentially painted in its longitudinal direction is sequentially transported forward between an ink film supply roll and winding roll, while a printing paper is repeatedly transported forward and backward in order to print out a color image by overlapping plural color inks. In color printing, the printing paper and ink film are partially overlapped and wound around a platen roller, and a thermal head is pressed against the platen roller by sandwiching the ink film and printing paper therebetween so that the thermal head transfers the color inks on the printing paper. In order to prevent wrinkles from being formed on the ink film, tension applying means applies tension force to the ink film by temporarily controlling or stopping revolution of the ink film supply roll. In addition, such tension force is also applied while the printing paper is transported backward, so that printing start position of each color ink is accurately coincided with printing position of the thermal head. Thus, a desirable color image can be printed out without color dislocation and without forming un-transferred portions thereof.

2 Claims, 3 Drawing Sheets

FIG.1 *(PRIOR ART)*
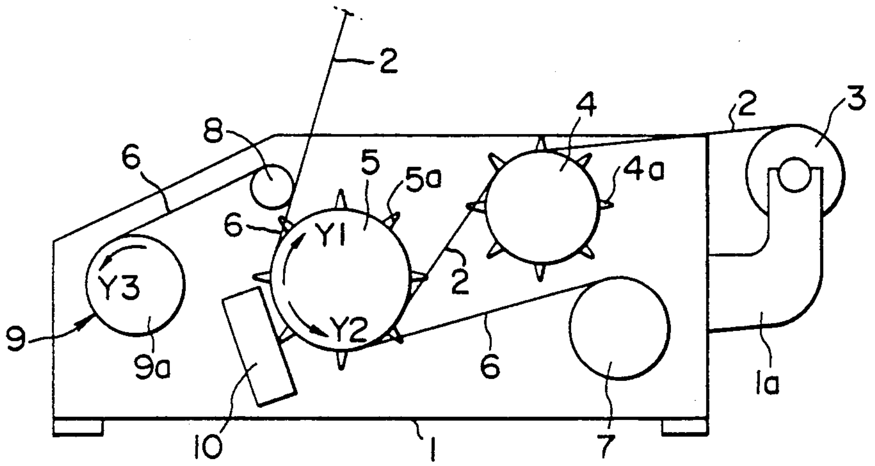
FIG.2 *(PRIOR ART)*
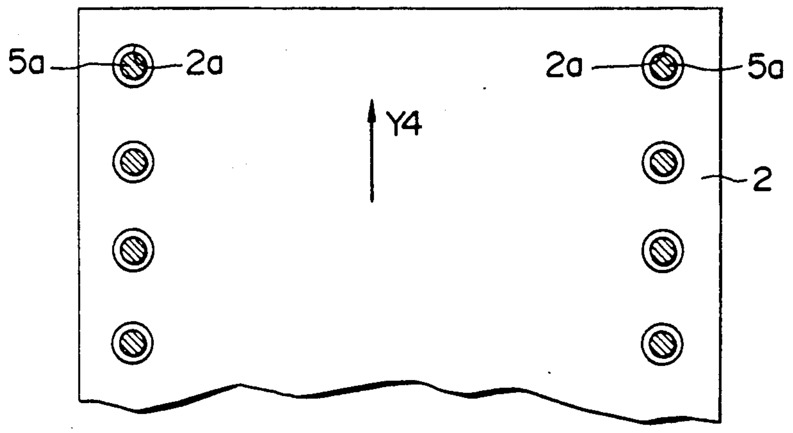
FIG.3 *(PRIOR ART)*
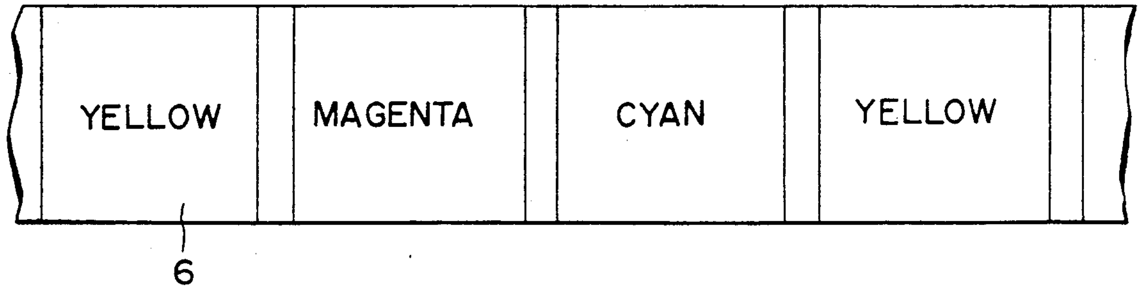

THERMAL TRANSFER TYPE COLOR PRINTER

BACKGROUND OF THE INVENTION

1. Field of the Invention

The present invention relates to a thermal transfer type color printer, and more particularly to a thermal transfer type color printer which prints out a color image of high quality without color deviation.

2. Prior Art

Thermal transfer type color printers are well known, and are conventionally used to print out the color image which is displayed on a display screen of a personal computer or a display screen for computer aided design (CAD) or computer aided manufacturing (CAM), system. This thermal transfer type color printer performs color printing to printing paper color inks of plural colors painted on an ink film. This thermal transfer type color printer has relatively simple construction, so that it is advantageous in saving much time and labor in maintenance and management thereof. Hereinafter, description will be given with respect to an example of this thermal transfer type color printer by use of FIGS. 1 to 3.

In FIG. 1, 1 designates a printer unit. At rear face of this printer unit 1, a printing paper supply roll 3 on which a printing paper 2 is wound up, is supported by a bracket 1*a* so that the roll 3 can freely revolve. As shown in FIG. 2, a plenty of feed holes 2*a*, . . . are disposed in a longitudinal direction at both edge portions of the printing paper 2. As shown in FIG. 1, the printing paper 2 which is pulled out from the supply roll 3 is partially wound and guided by a guide roller 4 and a platen roller 5, and then the printing paper 2 is pulled out from the printer unit 1. The above-mentioned guide roller 4 and platen roller 5 are provided for conveying the printing paper 2. Sprocket pins 4*a*, . . . are formed at outer peripheral face of the guide roller 4, while other sprocket pins 5*a*, . . . are formed at outer peripheral face of the platen roller 5. The diameters of those sprocket pins 4*a* and 5*a* are smaller than those of the feed holes 2*a* of the printing paper 2. In addition, those sprocket pins are provided in connection with the feed holes as shown in FIG. 2. The shaft edge of platen roller 5 is interconnected with a motor (not shown), so that the platen roller 5 can revolve around the shaft line thereof in a forward direction (i.e., Y1 direction) and in a negative direction (i.e., Y2 direction). This revolution of the platen roller 5 is transmitted to the roller 4 via a belt (not shown). This belt is wound by the guide roller 4 and platen roller 5 so that the rotational speed of the guide roller 4 will be equal to that of the platen roller 5 but the rotational direction of the guide roller 4 will be inverse to that of the platen roller 5.

Meanwhile, under the above guide roller 4, an ink film supply roll 7 on which an ink film 6 is wound up is mounted so that this supply roll 7 can freely revolve. As shown in FIG. 3, the color inks of yellow, magenta and cyan colors are sequentially painted in turn on the ink film 6, wherein the yellow, magenta and cyan colors are the primary colors of color image printing. The ink film 6 which is pulled out from the supply roll 7 is partially wound around outer portion of the printing paper 2 which is partially wound by the platen roller 5. Further, the ink film 6 is wound up by an ink film winding roll (hereinafter, simply referred to as "winding roll") 9*a* of ink roll (hereinafter film transporting means 9. This ink film feeding means 9 is provided for transporting the ink film 6 in its longitudinal direction, wherein this means 9 comprises the winding roll 9*a* and a drive unit (not shown) which revolves the winding roll 9*a* in Y3 direction.

Under the above-mentioned platen roller 5, a thermal head 10 is provided. This thermal head 10 is provided so that it can be pressed against and also separated from the outer peripheral face of the platen roller 5. In the case where this thermal head is pressed against the ink film 6 wound around the outer peripheral face of the platen roller 5 while the printing paper 2 is inserted between this ink, film and the platen roller, the thermal head gives thermal pulses of thermal energy to the ink film 6 so that the color ink painted on the ink film 6 is transferred onto the printing paper 2.

In the thermal transfer type color printer having the above-mentioned constitution, color printing is performed accordance with the following procedure.

First, the platen roller 5 is revolved in the forward direction (i.e., Y1 direction) so that the printing start position of the printing paper 2 is transported to the printing position of the thermal head 10, while the winding roll 9*a* of the ink film transporting means 9 is revolved in the Y3 direction so that the head position of the yellow color ink painted on the ink film 6 (see FIG. 3) will be coincided with the printing position of the thermal head 10. Next, the thermal head 10 is pressed against the ink film 6 which is wound around the outer peripheral face of the platen roller 5 via the printing paper 2. Then, the platen roller 5 is revolved forward, and the printing paper 2 is transported toward the printing paper discharging side in the state where the printing paper 2 is piled with the ink film 6. In this state, the thermal pulses are adequately given to the thermal head 10, so that the yellow color ink is transferred on the printing paper 2.

After completing the yellow color printing as described above, the thermal head 10 is separated from the ink film 6. Next, the platen roller 5 is revolved in the forward direction so that the printing paper 2 will be separated from the ink film 6. Then, the platen roller 5 is revolved in the reverse direction (i.e., the Y2 direction) by the predetermined distance so that the printing paper 2 is transported toward the printing paper supplying side (i.e., the right side in FIG. 1), whereby the printing start position of the printing paper 2 is returned back to the printing position of the thermal head 10. At the same time, the winding roll 9*a* of the ink film transporting means 9 is slightly revolved in the Y3 direction so that the head position of magenta color ink painted on the ink film 6 (see FIG. 3) will be coincided with the printing position of the thermal head 10.

Similar to the case of yellow color printing, the thermal head 10 is pressed against the ink film 6 and the platen roller 5 is revolved in the forward direction so that the magenta color ink is transferred on the printing paper 2. Thus, the magenta color printing is completed. Next, similar to the above-mentioned printing procedure, the printing paper 2 is transported in the reverse direction and the ink film 6 is transported. Then, the cyan color ink is transferred on the printing paper 2. As a result, the color image is printed on the printing paper 2.

Meanwhile, in the case where the thermal head 10 transfers the ink of ink film 6 on the printing paper 2 in the conventional thermal transfer type color printer, the thermal contraction must be effected on the ink film 6 due to the heat generated by the thermal head 10, so that the ink film must be wrinkled. For this reason, the ink film 6 must be folded so that certain portion of the ink film will be adhered to the printing paper 2. When the thermal transfer is performed in such state, it is difficult to transfer the ink of the folded portion of the ink film 6 to the printing paper 2. Hence, the transferred image will have the color deviation, or there will be the un-transferred portion of the image. So, there is a disadvantage in that the desirable image can not be obtained. This must be remarkably emerged as the color deviation of image in the color printing for transferring plural colors, which deteriorates the image quality.

On the other hand, since the three color inks painted on the ink film 6 are sequentially transferred on the printing paper in the conventional thermal transfer type color printer, the platen roller 5 is reversely revolved to the predetermined position so that the printing position of the thermal head 10 will be repeatedly coincided with the printing start position. This deteriorates the accurate coincidence between the printing position of the thermal head 10 and the printing start position of the printing paper 2 at the printing start timing of each color, and this also lowers the precision for repeatedly transferring each color ink. Therefore, there is a problem in that the color image having high quality can not be obtained.

More specifically, the feed holes 2*a*, . . . of the printing paper 2 are matched with the sprocket pins 5*a*, . . . of the platen roller 5, and the platen roller 5 is revolved forward and backward so that the printing paper 2 can move forward and backward along the outer peripheral face of the platen roller 5. When the platen roller 5 is revolved forward so that the thermal head 10 is pressed against the ink film 6 in the printing period, the frictional force in the Y2 direction as shown in FIG. 3 is applied between the printing paper 2 and the outer peripheral face of platen roller 5 or the ink film 6 due to the pressure applied by the thermal head 10. Thus, the printing paper 2 is transported in the Y4 direction shown in FIG. 2, wherein each of the sprocket pins 5*a*, . . . is regularly matched with each of the feed holes 2*a*, . . . thereof.

On the contrary, in the case where the printing paper 2 is transported in the direction reverse to the Y4 direction (i.e., in the backward direction), the thermal head 10 is separated from the ink film 6 and the pressure thereof is released, so that the above frictional force will not be applied. For this reason, the printing paper 2 is transported in the state where each of the sprocket pins 5*a*, . . . is irregularly matched with each of the feed holes 2*a*, . . . thereof. Even when the platen roller 5 is revolved backward to the predetermined position, the printing paper 2 must be transported in the unstably deviated manner in the range of the difference between the inner diameter of feed hole 2*a* and the outer diameter of sprocket pin 5*a*. Therefore, it becomes impossible to coincide the predetermined printing position of the thermal head 10 with the printing start position.

In order to prevent the wrinkles of ink film from being formed and also prevent the color dislocation from occurring, the conventional printer (as disclosed in Japanese Patent Application No. 57-180335) provides tension applying means by which tension force is applied to the ink film in the printing. As for this tension applying means, electromagnetic brake which is driven to be on or off is used. In addition, in order to adjust braking force with slip control of such electromagnetic brake, the voltage applied to the brake is controlled to become lower than the rated voltage. However, due to the mechanical variation of the brake and voltage variation of power source, it is difficult to accurately adjust the tension force applied to the ink film.

SUMMARY OF THE INVENTION

It is accordingly a primary object of the present invention to provide a thermal transfer type color printer by which the wrinkles of the ink film due to the thermal contraction are prevented from being formed so that the transferred image will not include the density deviation, color deviation and un-transferred portion, whereby it becomes possible to certainly print out the desirable characters and colors having good image quality.

It is another object of the present invention to provide a thermal transfer type color printer in which the printing position of the thermal head is accurately adjusted with the printing start position of the printing paper so that the precision for transferring each color ink can be improved, whereby the color image having high quality can be obtained.

In a first aspect of the present invention, there is provided a thermal transfer type color printer comprising:

(a) an ink film supply roll for supplying an ink film on which plural color inks are painted in turn;

(b) a winding roll for winding up the ink film;

(c) a platen roller for transporting a printing paper, the printing paper being partially wound around an outer peripheral face of the platen roller, while the ink film being partially wound around the platen roller via the printing paper;

(d) a thermal head which can be pressed against and separated from the platen roller, the thermal head being pressed against the platen roller by putting the ink film and printing paper therebetween so that heat applied by the thermal head melts and transfers the color ink on the printing paper during color printing, the thermal head being separated from the platen roller after performing the color printing;

(e) tension applying means for applying tension force to the ink film between the ink film supply roll and the thermal head while the thermal head is pressed against the platen roller.

In a second aspect of the present invention, there is provided a thermal transfer type color printer comprising:

(a) an ink film supply roll for supplying an ink film on which plural color inks are sequentially painted in its longitudinal direction;

(b) ink film transporting means for transporting the ink film;

(c) a cylindrically-shaped platen roller capable of revolving forward and backward around its shaft line, the platen roller having an outer peripheral face on which plural sprocket pins are regularly formed, the sprocket pins being arranged in such a manner that each of the sprocket pins can be matched with each of feed holes formed at an edge portion of a printing paper in its longitudinal direction, the printing paper being partially wound around the outer peripheral face of the platen roller and the ink film being partially wound to be in close contact with the printing paper so that the printing paper is transported forward and backward in accordance with revolution of the platen roller in color printing;

(d) a thermal head capable of being pressed against and separated from the platen roller; and (e) tension applying means for applying tension force to the ink film in its longitudinal direction so that the ink film can be in close contact with the printing paper wound around the platen roller during the printing paper is transported backward by the platen roller, the thermal head being repeatedly pressed against and separated from the platen roller which is repeatedly revolved forward and backward so that the printing paper is transported forward and backward while the ink film is sequentially transported forward, whereby the thermal head transfers the plural color inks on the printing paper so that a desirable color image will be printed out without color dislocation and without forming un-transferred portions thereof by the tension applying means.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings:

FIG. 1 is a sectional view showing the mechanical constitution of the conventional thermal transfer type color printer;

FIG. 2 is a plan view of the printing paper;

FIG. 3 is a plan view of the color ink film;

DESCRIPTION OF THE PREFERRED EMBODIMENTS

Figure 4:
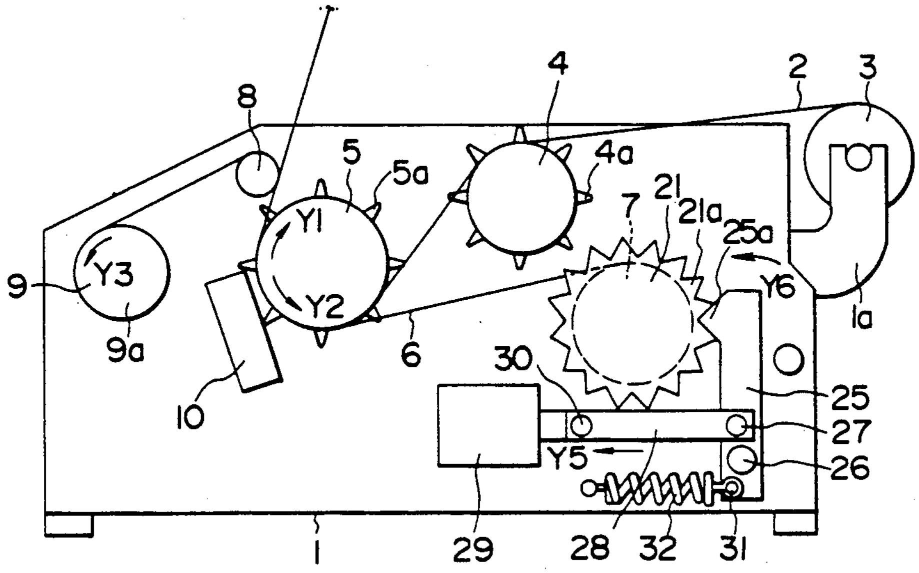
FIG. 4 is a diagrammatically sectional view showing mechanical constitution of thermal transfer type color printer according to a first embodiment of the present invention.

Next, description will be given with respect to the embodiments of the present invention in conjunction with the drawings, wherein like reference characters designate like or corresponding parts throughout the several views.

[A] First Embodiment

Figure 5:
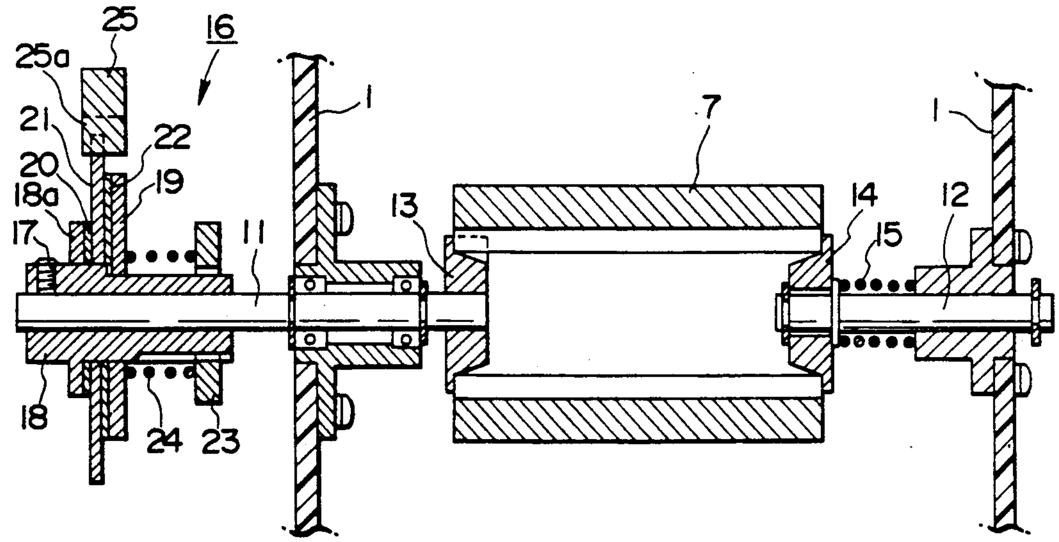
FIG. 5 is a sectional view showing mechanical constitution of an ink film supply roll used in the first embodiment shown in FIG. 4.

FIGS. 4 and 5 are sectional views both designating the first embodiment of the present invention.

In FIG. 5, 11 and 12 designate holding shafts each holding an ink film supply roll 7. These holding shafts 11 and 12 are mounted to the printer unit 1 in a manner that the shaft lines thereof coincide with each other, so that these holding shafts can freely revolve. Each of holding members 13 and 14 for holding the ink film supply roll 7 is mounted at each of shaft edges of the holding shafts 11 and 12 which face to each other. The ink film supply roll 7 is mounted between these holding members 13 and 14, and a coil spring 15 around the holding shaft 12 presses the roll 7 so that this roll 7 will be forced to be held between these holding members. Thus, the assembly of the holding shafts 11 and 12 and the ink film supply roll 7 can integrally revolve.

A frictional clutch 16 is mounted at another shaft edge of the holding shaft 11. This frictional clutch 16 is constituted as follows: a clutch shaft 18 is fixed to the holding shaft 11 by a screw 17; and a frictional board 19 is mounted to this clutch shaft 18. The vertically sectional shape of the holding shaft 11 is formed like the letter "D", and the hole shape of the clutch shaft 18 is also formed like the letter "D". Hence, the frictional board 19 can slide on the clutch shaft 18 in its shaft direction, and this frictional board can also revolve with the clutch shaft. The frictional board 18 has a frictional board portion 18*a* formed like a brim, and frictional member 20, frictional board 21 and frictional member 22 are mounted to certain portion of the clutch shaft 18 between the frictional board 19 and the frictional board portion 18*a* in a manner that these members can be removed therefrom. A coil spring 24 is arranged between the frictional board 19 and an adjusting nut 23, and this coil spring 24 presses the frictional board 19, frictional member 22, frictional board 21 and frictional member 20 to the frictional board portion 18*a*. The adjusting nut 23 is screwed to the clutch shaft 18, so that the pressure applied by the coil spring 24 can be adjusted by this nut.

In FIG. 4, a lever 25 is mounted to a fulcrum 26 provided in the printer unit 1 in a manner that this lever can freely revolve around the fulcrum. At the tip edge portion of the lever 25, a projection 25*a* is formed, and this projection 25*a* has the shape matching with each of concave portions formed between teeth 21*a*, . . . of the above-mentioned frictional board 21. In addition, the lever 25 is connected to a rod 28 by a connecting pin 27 which is arranged between the projection 25*a* and fulcrum 26. The rod 28 is moved in Y5 direction by an actuator 29, and this rod 28 is connected to this actuator 29 by a connecting pin 30. The actuator 29 is connected to a control equipment (not shown). At only a time when the thermal head 10 is pressed against the platen roller 5, the actuator 29 is operated. When the actuator 29 operates, the lever 25 revolves in Y6 direction around the fulcrum 26, so that the projection 25*a* is moved to be matched with one of the concave portions between the teeth 25*a*. Further, the lever 25 is connected to a coil spring 32 by a pin 31 arranged under the fulcrum 26, and this coil spring 32 is fixed at the printer unit 1. When the actuator 29 stops operating, the lever 25 is forced to be revolved in the direction reverse to the Y6 direction by such coil spring 32 so that the lever 25 will be separated from the frictional board 21.

When the thermal head 10 is pressed against the platen roller 5 and then the printing is performed in the thermal transfer type color printer having the constitution as described heretofore, the projection 25*a* of the lever 25 is moved to be matched with one of the concave portions between the teeth 21*a* of the frictional board 21. For this reason, the ink film supply roll 7 is controlled by the frictional force generated between the frictional board 21 and frictional members 20, 22, so that the tension force is applied to the ink film 6 between the thermal head 10 and ink film supply roll 7. Thus, it is possible to prevent the thermal contraction due to the heat of thermal head 10 from being effected on the ink film 6, so that the wrinkles of the ink film 6 can be prevented from being formed. Therefore, the density deviation, color deviation and un-transferred portion of the image can be eliminated, so that it becomes possible to certainly print out the characters and colors having good image quality.

Further, since the ink film 6 and printing paper 2 are transported together by the platen roller 5 in the printing, the winding roll 9*a* must wind up the ink film 6 having the length transported by the platen roller 5. Therefore, even if the tension force is applied to the ink film 6 between the ink film supply roll 7 and thermal head 10, the torque due to such tension force must not be additionally applied to the motor of the winding roll 9*a*. Meanwhile, when the printing is not performed, the lever 25 is separated from the frictional board 21 so that the ink film supply roll 7 is not controlled by the above frictional force. Hence, the tension force is not applied to the ink film 6. For this reason, the motor having the capacity similar to that of the conventional motor is sufficient, and the motor having large torque is not required. Therefore, the present first embodiment do have the merit in that the image having high image quality can be obtained without enlarging the scale of the motor driving the winding roll 9.

As described heretofore, the first embodiment provides tension applying means which applies the tension force to the ink film between the ink film supply roll and thermal head when the thermal head is pressed against the platen roller. Hence, the printing is performed while the ink film is pulled. For this reason, the thermal contraction due to the heat of thermal head is prevented from being effected on the ink film. In other words, it is possible to prevent the wrinkles from being formed on the ink film. Thus, the first embodiment can demonstrate the first effect in which the desirable characters and colors having good image quality can be printed out.

Further, as described before, the winding roll does not need the motor of large capacity. Therefore, the first embodiment can also demonstrate the second effect in which the color image having high image quality can be obtained without enlarging the capacity of motor for the winding roll.

[B] Second Embodiment

Figure 7:
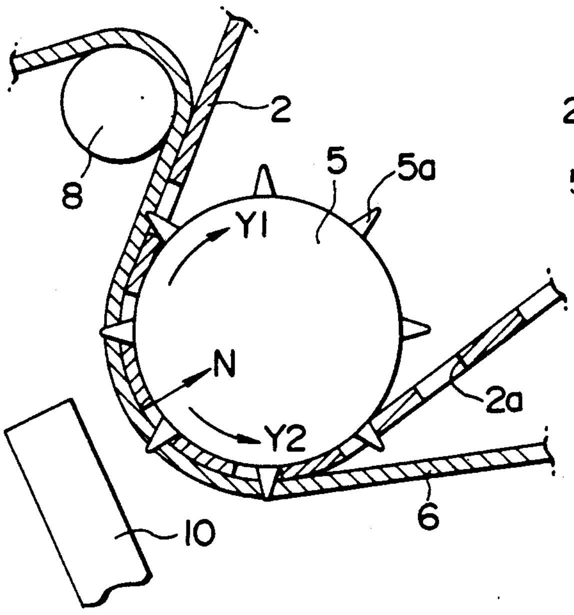
FIG. 7 is a magnified view showing the vicinity of the platen roller in FIG. 6.
Figure 8:
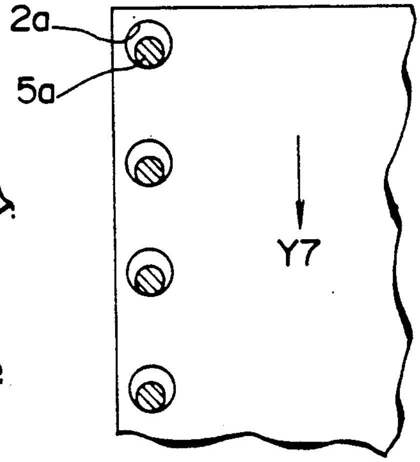
FIG. 8 is a development diagram of the printing paper wound around the platen roller.

Next, description will be given with respect to the second embodiment in conjunction with FIGS. 6 to 8, wherein parts identical to those of the first embodiment will be designated by the same numerals.

Figure 6:
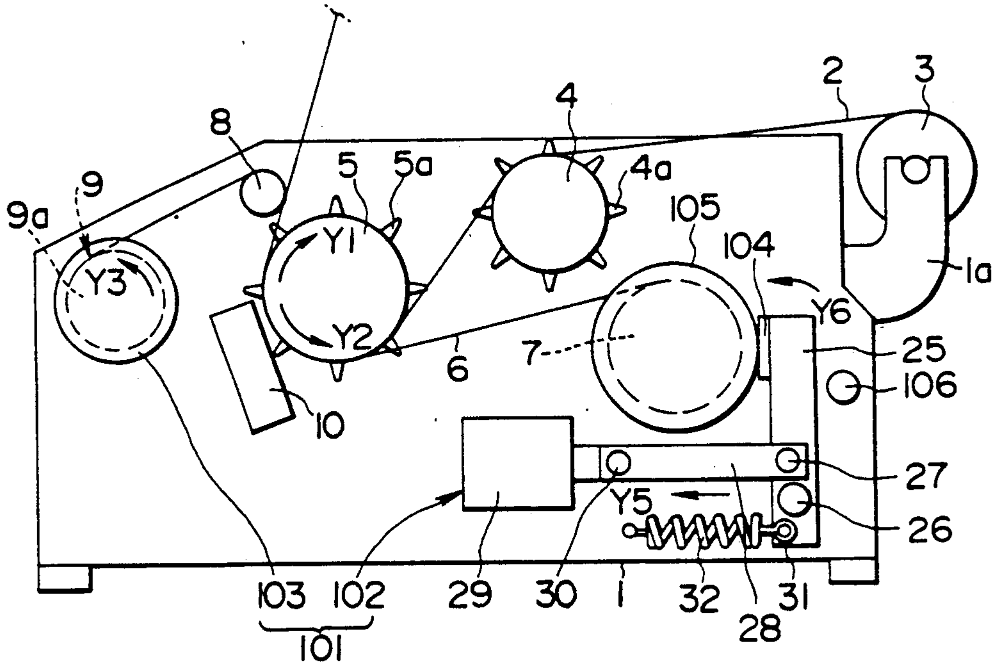
FIG. 6 is a diagrammatically sectional view showing mechanical constitution of thermal transfer type color printer according to a second embodiment.

In FIG. 6, 101 designates tension applying means according to the second embodiment. This tension applying means 101 works to apply the tension force to the printing paper 2 in its longitudinal direction when the printing paper 2 is transported backward. This tension applying means 101 comprises a control unit 102 and a frictional clutch 103. The control unit 102 is provided in the vicinity of the ink film supply roll 7, while the frictional clutch 103 is provided on the same shaft of the winding roll 9*a* of the ink film transporting means 9. The control unit 102 is provided for stopping the revolution of the ink film supply roll 7 by use of the frictional force, and this control unit 102 is constituted as described in the first embodiment. Within such control unit 102, the actuator 29 is connected to the control equipment (not shown) so that this actuator is activated when the printing paper 2 is transported backward.

Meanwhile, at the tip edge of the lever 25 described before, a frictional pad 104 made of soft metal such as gun metal is fixed. In addition, a round-shaped friction wheel 105 is ensured on the same shaft of the ink film supply roll 7. In the case where the actuator 29 is activated so that the rod 28 is pulled in Y5 direction, the frictional pad 104 is pressed to be in contact with outer peripheral face of the frictional wheel 105. Therefore, the revolution of the ink film supply roll 7 is strongly forced to be stopped. In the case where the operation of actuator 29 is stopped, the frictional pad 104 is separated from the outer peripheral face of the frictional wheel 105 by the coil spring 32 so that the control force applied to the ink film supply roll 7 will be released. In this case, the returning distance of the lever 25 due to the coil spring 32 is regulated by a stopper 106 fixed to the printer unit 1, whereby the returning movement of the lever 25 is stopped so that the lever 25 will not touch the printer unit 1 directly.

Meanwhile, the frictional clutch 103 is mounted between the winding roll 9*a* of the ink film transporting means 9 and driving unit (not shown) which is fixed to the same shaft of the winding roll 9*a*. Within such frictional clutch 103, a pair of clutch facings are maintained in such a manner that these clutch facings are normally touched with each other. In other words, the revolution of the driving unit is normally transmitted to the winding roll 9*a* via the frictional clutch 103. In this case, the statical frictional torque between the clutch facings is set smaller than the revolution torque of the driving unit. Hence, in the case where the driving unit is activated in the state where the revolution of the ink film supply roll 7 is stopped so that the ink film 6 can not be pulled out, the slip is occurred between the clutch facings and the revolution torque of the driving unit is adequately decreased. Such decreased revolution torque of the driving unit is transmitted to the winding roll 9*a*, so that the adequate tension force is applied to the ink film 6. Thus, as shown in FIG. 7, the ink film 6 is in close contact with the printing paper 2 which is wound around the outer peripheral face of the platen roller 5.

In such thermal transfer type color printer providing the tension applying means 101 as described above, of course, the printing start position of printing paper 2 is adjusted to be matched with the printing position of thermal head 10 before transferring each color ink. However, such position adjusting procedure of the second embodiment is quite different from that of the conventional thermal transfer type color printer described before. Hereinafter, description will be given mainly with respect to this position adjusting procedure of the second embodiment in conjunction with FIGS. 6 to 8.

As shown in FIG. 6, before the printing is performed, i.e., before the yellow color ink is transferred to the printing paper, the platen roller 5 is revolved forward in Y1 direction so that the printing paper 2 is transported until its printing start position passes over the printing position of the thermal head 10. At the same time, the winding roll 9*a* is revolved in Y3 direction so that the head position of the yellow color ink will coincide with the printing position of thermal head 10. Next, the actuator 29 of the control unit 102 in the tension applying means 101 is activated so that the frictional pad 104 is pressed against the outer peripheral face of frictional wheel 105, whereby the revolution of ink film supply roll 7 is strongly stopped. In addition, the driving unit of the ink film transporting means 9 is activated such that the adequate tension force is applied to the ink film 6 in its longitudinal direction. In such tension applied state, the platen roller 5 is revolved backward to the predetermined position so that the printing , and the printing paper 2 is transported backward (i.e., in the rightward direction in FIG. 6) so that the printing start position of printing paper 2 will be coincided with the printing position of thermal head 10. After the thermal head 10 is pressed to the ink film 6, the frictional pad 104 of the control unit 102 is separated from the outer peripheral face of frictional wheel 105 so that the revolution control for the ink film supply roll 7 is released. Thereafter, as similar to the conventional printing described before, the printing paper 2 and ink film 6 are transported together so that the yellow color ink is transferred to the printing paper 2.

After the yellow color printing is completed, the thermal head 10 is separated from the platen roller 5 as similar to the conventional color printing. Then, after executing the separation of the printing paper 2 and ink film 6 and the position coinciding operation for coinciding the head position of magenta color ink with the printing position of thermal head 10, the platen roller 5 is revolved backward to the thermal transfer start position of the above-mentioned yellow color ink while the tension force is applied to the ink film 6 in its longitudinal direction. Then, the printing paper 2 is transported backward so that the printing start position of printing paper 2 will be coincided with the printing position of thermal head 10. Thereafter, as similar to the yellow color printing, the tension force applied to the ink film 6 is released in the state where the thermal head 10 is pressed against the platen roller 5. Thus, the magenta color ink is transferred to the printing paper 2. After transferring the magenta color ink, the printing paper 2 is transported backward again. Then, the cyan color ink is transferred to the printing paper 2. As described heretofore, the color image is printed on the printing paper 2.

Meanwhile, in the above printing procedure, when the printing paper 2 is transported backward before each color ink is transferred thereto, the tension applying means 101 applies the tension force to the ink film 6 in its longitudinal direction. Therefore, as shown in FIG. 7, the ink film 6 is in close contact with the printing paper 2 which is wound around the outer peripheral face of the platen roller 5. Therefore, the pressing force in N direction is effected to the printing paper 2. In such state, when the platen roller 5 is revolved backward in Y2 direction, the frictional force works between the printing paper 2 and the outer peripheral face of platen roller 5 or the ink film 6. Thus, as shown in FIG. 8, the printing paper 2 is transported in the state where each sprocket pin 5*a* is regularly in contact with the edge of the feed hole 2*a* corresponding to the backward direction (i.e., Y7 direction). In addition, since the thermal head 10 is pressed to the printing paper 2 before the tension force is released, each color printing can be started in the same state where each of the sprocket pins 5*a*, . . . is adequately adjusted to be matched with each of the feed holes 2*a*, . . .

In this case, the platen roller 5 is revolved backward to the predetermined position before each color ink is transferred to the printing paper 2. At this time, the printing start position of printing paper 2 is always set equally in each color printing. Therefore, the printing start position of printing paper 2 can be accurately coincided with the printing position of thermal head 10. For this reason, the overlapping precision of each color ink can be remarkably improved, so that it is possible to obtain the color image having high image quality.

Meanwhile, the tension applying means 101 is not limited to the control unit 102 and frictional clutch 103 in the second embodiment. For example, the frictional clutch 103 can be removed from the second embodiment. In this case, control means such as an electromagnetic brake is mounted to the same shaft of the winding roll 9*a*, and the guide roller 8 capable of moving is mounted at the upper left side of the platen roller 5. Then, when the printing paper 2 is transported backward, the revolution of the ink film supply roll 7 is stopped by the control unit 102 and the revolution of the winding roll 9*a* is stopped by the above electromagnetic brake. In such state, the guide roller 8 is moved upward so that the tension force can be applied to the ink film 6 as similar to the second embodiment.

As described heretofore, by providing the tension applying means, the second embodiment can maintain the same transporting distance of the printing paper in the backward direction when the platen roller is revolved backward to the predetermined position. For this reason, even when the printing paper is repeatedly transported backward in order to sequentially print out the plural color inks painted on the ink film, the printing start position of printing paper can be accurately coincided with the printing position of thermal head. Thus, the overlapping precision of each color ink can be improved, so that the color image having high image quality can be obtained.

This invention may be practiced or embodied in still other ways without departing from the spirit or essential character thereof as described heretofore. Therefore, the preferred embodiments described herein are illustrative and not restrictive, the scope of the invention being indicated by the appended claims and all variations which come within the meaning of the claims are intended to be embraced therein.

What is claimed is:

1. A thermal transfer type color printer comprising:

(a) an ink film supply roll for supplying an ink film on which plural color inks are painted in turn;

(b) a winding roll for winding up said ink film;

(c) a platen roller for transporting a printing paper, said printing paper being partially wound around an outer peripheral face of said platen roller, while said ink film being partially wound around said platen roller via said printing paper;

(d) a thermal head which can be pressed against and separated from said platen roller, said thermal head being pressed against said platen roller by putting said ink film and printing paper therebetween so that heat applied by said thermal head melts and transfers said color ink on said printing paper during color printing, said thermal head being separated from said platen roller after performing the color printing;

(e) tension applying means for applying tension force to said ink film between said ink supply roll and said thermal head only while said thermal head is pressed against said platen roller, said tension applying means including a frictional clutch mounted to a holding shaft of said ink film supply roll, said frictional clutch working to thereby apply the tension force to said ink film at only a time when said thermal head is pressed against said platen roller, said tension applying means further including tension control means which contains actuator means and a lever having a projection at its tip edge portion, while said frictional clutch including a frictional board and frictional member, said frictional board having plural teeth on its outer peripheral face and revolving around said holding shaft, said actuator means being activated so that said projection of the lever is moved to be matched with one or concave portions between said teeth of the frictional board during the color printing, whereby frictional force generated between said frictional board and said frictional member controls and intermittently stops revolution of said ink film supply roll via said frictional board so that the tension force is applied to said ink film during the color printing.

2. A thermal transfer type color printer comprising:

(a) an ink film supply roll for supplying an ink film on which plural color inks are sequentially painted in its longitudinal direction, said ink film supply roll including a frictional wheel having an outer peripheral surface which is revolved in synchronism with said ink film supply roll;

(b) ink film transporting means for transporting said ink film;

(c) a cylindrically-shaped platen roller capable of revolving forward and backward around its shaft line, said platen roller having an outer peripheral face on which plural sprocket pins are regularly formed, said sprocket pins being arranged in such a manner that each of said sprocket pins can be matched with each of feed holes formed at an edge portion of a printing paper in its longitudinal direction, said printing paper being partially wound around the outer peripheral face of said platen roller and said ink film being partially wound to be in close contact with said printing paper so that said printing paper is transported forward and backward in accordance with revolution of said platen roller in color printing;

(d) a thermal head capable of being pressed against and separated from said platen roller; and (e) tension applying means for applying tension force to said ink film in its longitudinal direction so that said ink film can be in close contact with said printing paper wound around said platen roller while said printing paper is transported backward by said platen roller, said tension applying means including control means and a frictional clutch, said frictional clutch being provided in connection with said ink film transporting means, said control means including a lever, a frictional pad mounted on the lever and actuator means coupled to the lever and which is activated while said printing paper is transported backward, said actuator means is activated so that said frictional pad is pressed against the outer peripheral face of said frictional wheel and then revolution of said ink film supply is stopped before performing printing of each color ink, said ink film transporting means being simultaneously activated so that the tension force is applied to said ink film, thereafter said platen roller being revolved backward so that a printing start position of each color ink will be coincided with a printing position of said thermal head under the tension force, said tension applying means further including a guide roller capable of moving which guides said ink film and an electromagnetic brake which is mounted in connection with said ink film transporting means, said guide roller being arranged in the vicinity of said ink film transporting means, said electromagnetic brake controlling transport of said ink film and said guide roller controlling its pressure applied to said ink film by moving so that the tension force is adequately applied to said ink film;

said thermal head being repeatedly pressed against and separated from said platen roller which is repeatedly revolved forward and backward so that said printing paper is transported forward and backward while said ink film is sequentially transported forward, whereby said thermal head transfers said plural color inks on said printing paper so that a desirable color image will be printed out without color dislocation and without forming untransferred portions thereof by said tension applying means.

* * * * *

UNITED STATES PATENT AND TRADEMARK OFFICE

CERTIFICATE OF CORRECTION

PATENT NO. : 5,017,943

DATED : May 21, 1991

INVENTOR(S) : Hiromitsu Ogita; Akikazu Toida

It is certified that error appears in the above-identified patent and that said Letters Patent is hereby corrected as shown below:

Column 11, line 6, in Claim 1, before "concave", change "or" to --of--.

Signed and Sealed this

Second Day of March, 1993

*Attest:*

STEPHEN G. KUNIN

*Attesting Officer*

*Acting Commissioner of Patents and Trademarks*